(12) United States Patent
Treppedi et al.

(10) Patent No.: US 6,474,097 B2
(45) Date of Patent: Nov. 5, 2002

(54) COMPARTMENTED MOBILE COOLER

(76) Inventors: Frank Treppedi, 1554 Mace Ave., Bronx, NY (US) 10469; Thomas Bochichio, 320 Cameo Dr., Massapequa, NY (US) 11762

( * ) Notice: Subject to any disclaimer, the term of this patent is extended or adjusted under 35 U.S.C. 154(b) by 0 days.

(21) Appl. No.: 09/767,240

(22) Filed: Jan. 22, 2001

(65) Prior Publication Data

US 2002/0095947 A1 Jul. 25, 2002

(51) Int. Cl.[7] .............................. F25D 3/08; B60F 57/00
(52) U.S. Cl. ........................................ 62/457.7; 280/30
(58) Field of Search ............................ 62/457.7, 457.1, 62/459, 464, 443, 371; 220/23.87, 592.03; 280/30, 47.18, 43.14, 9

(56) References Cited

U.S. PATENT DOCUMENTS

| | | | |
|---|---|---|---|
| 244,898 A | * | 7/1881 | Hoskins |
| 4,024,731 A | * | 5/1977 | Branscum .................. 62/457.7 |
| 5,306,029 A | * | 4/1994 | Kaiser II ..................... 280/30 |
| 5,407,218 A | * | 4/1995 | Jackson ................. 62/457.7 X |
| 5,465,985 A | * | 11/1995 | Devan et al. ................. 280/30 |
| 5,979,175 A | * | 11/1999 | Ellison ..................... 62/457.7 |
| 6,153,857 A | * | 11/2000 | Gunnels |

FOREIGN PATENT DOCUMENTS

| | | | |
|---|---|---|---|
| JP | 08172994 A | * | 7/1996 |
| JP | 11266990 A | * | 10/1999 |

* cited by examiner

*Primary Examiner*—Chen-Wen Jiang
(74) *Attorney, Agent, or Firm*—Michael I Kroll (57) ABSTRACT

The present invention discloses an insulated cooler 10 having ski runners 16 and wheels 34 in combination for mobility for attachment to the underside of the cooler body. The cooler also has the interior partition at 58 to form a thermos container portion 60 and an ice cooler portion 56. A removable thermos 44 with cap and pump spout 36 are disclosed which pump spout 36 extends through a recess 66 in one sidewall of the cooler body. Molded compartments 48, 52 are located on the underside of the cooler lid 42 for storage of various items. Cargo netting 20 is attached to the side of the cooler with snap ring ports 68 which also can hold various items. The underside of the cooler contains recessed wheel wells 70 for receiving the wheels 34 which are attached with retaining pins 72 into mounting holes 84 on the underside of the cooler body. Also disclosed is a umbrella retainer bracket 32 for holding an umbrella shaft 30 using a retaining knob 40 in such a way that the point of the umbrella 76 can be inserted into the sand or ground 14 so as to hold the present invention 10 in a stable position.

11 Claims, 8 Drawing Sheets

COMPARTMENTED MOBILE COOLER

BACKGROUND OF THE INVENTION

1. Field of the Invention

The present invention relates generally to mobile coolers and more specifically to a cooler having wheels, a convertible sled or ski arrangement, compartments and cargo pockets for stowing accessory items, and a cylindrical umbrella holder for maintaining the umbrella during transport and use. The present invention includes a cooler container wherein the interior is partitioned to form a thermos containment portion and an ice cooler portion. An independent removable thermos is maintained within the thermos containment portion and has a pump spout extending through a recess in a cooler container sidewall to an exterior region thereof for dispensing the liquid stored therein. Molded compartments are located on the underside of the cooler lid for the storage of eating utensils, condiments and other such sundries. Snap ring ports are connected to the exterior sides of the cooler container and the topside of the cooler lid to provide an attachment means for removable cargo pockets that could hold items such as plates, cups, toys, lotions, towels, blankets, clothes and other such items that the user may desire to transport. The underside of the cooler container has unobtrusive recessed wheels and recesses for accepting a snap ring attachment means for securing the runner members to the cooler. A retractable handle is pivotally hinged to an inferior portion on a sidewall of the cooler container. The present invention further includes a cylindrical umbrella shaft retainer with a retaining knob to hold an umbrella in a raised position above the ground surface during transport and in place when imbedded in the sand or ground during use. An umbrella with a palm tree type awning could also be included.

Portable coolers are well known in the art and are often heavy when fully laden and difficult to carry, this has been addressed in the prior art by the addition of wheels or ski runners to such cooler devices but people going to a picnic, the beach or other such outings often have to bring bags containing other necessities that may be needed such as umbrellas, blankets, toys and the like which can be awkward or require several trips back and forth to the desired location. The present invention overcomes the shortcomings of the prior art by introducing a portable cooler that can be easily transported over soft or rigid surfaces due to the combination of wheels and ski runner members. The plurality of cargo pockets, compartments and the umbrella holder allow a user to transport a great deal of beach or picnic supplies from one location to another relatively unencumbered.

2. Description of the Prior Art

Numerous portable coolers have been provided in prior art. Typical of these is U.S. Pat. No. 3,395,550 issued to Straughter H. Dungan on Aug. 6, 1968.

Another patent was issued to Kenneth J. Thorpe on May 22, 1984 as U.S. Pat. No. 4,449,378. Yet another U.S. Pat. No. 4,577,475 was issued to Samuel R. Herrera on Mar. 25, 1986 and still yet another was issued on Mar. 10, 1987 to Richard A. Tarozzi et al. as U.S. Pat. No. 4,648,512. Another patent was issued on May 26, 1987 to Richard A. Tarozzi et al. as U.S. Pat. No. 4,667,484. Another patent was issued to Daniel R. Boville on Jul. 20, 1993 as U.S. Pat. No. 5,228,706 and one more patent was issued on Oct. 5, 1993 as U.S. Pat. No. 5,249,438 to Michael A. Rhaney et al. U.S. Pat. No. 5,269,157 was issued to Michael Ciminelli et al. on Dec. 14, 1993 and another patent was issued to Joseph C. Dumoulin on Dec. 20, 1994. Still another patent was issued to Charles F. Mohr on Apr. 25, 2000 as U.S. Pat. No. 6,054,120. U.S. Pat. No. 6,065,591 was issued on May 23, 2000.

U.S. Pat. No. 3,395,550

Inventor: Slaughter H. Dungan

Issued: Aug. 6, 1968

A portable compartmental container for outdoor use while fishing, at the beach or picnic ground. Suitable for transportation in trunk of user's car. Has Two tightly closable compartments; a main compartment for ice, fish or the like, and a smaller auxiliary compartment for drinking water. This latter compartment is provided with a dispensing spigot.

U.S. Pat. No. 4,449,378

Inventor: Kenneth J. Thorpe

Issued: May 22, 1984

An insulated chest for the storage and transportation of hot and cold foods to be carried as a backpack is disclosed. The chest has a hollow box-like body having four side walls, a bottom wall and top wall. There is a first opening in one of the side walls and a door adapted to be opened and closed is attached to the body so that it seals the opening when in a closed position. In the interior of the chest a removable divider is detachably connected to the side walls below the first opening. The chest can also have a second divider sealingly connected to the side walls in the interior of the chest, defining a liquid-holding chamber. A spigot mounted on a side wall extends through the side wall into the liquid-holding chamber. One of the walls has a second opening to the liquid-holding chamber, through which the chamber can be filled with liquid, and there are means for sealing the second opening.

U.S. Pat. No. 4,577,475

Inventor: Samuel R. Herrera

Issued: Mar. 25, 1986

A portable cooler or ice chest comprising a container for ice insulated on the sides with a drain and a base compartment with insulated recesses situated beneath the container. Adapted to fit in the recesses are closable bins for storage and cooling of beverages or items. The bins are separate from the container but not by insulation.

U.S. Pat. No. 4,648,512

Inventor: Richard A. Tarozzi

Issued: Mar. 10, 1987

An improved portable cooler construction having a pair of recesses formed in opposing side walls that define with pivotally supported closure members additional cavities that will be maintained at a different temperature than the main cavity formed in the main body portion of the cooler and in which non-food articles may be stored and/or carried.

U.S. Pat. No. 4,667,484

Inventor: Richard A. Tarozzi et al.

Issued: May 26, 1987

A portable cooler and removable lid therefor in which the lid is formed with a cavity for receiving articles and carrying them independently of the cooler body. A pivotally supported closure member is carried by the lid for closing its cavity and retaining articles within it.

U.S. Pat. No. 5,228,706

Inventor: David R. Boville

Issued: Jul. 20, 1993

In a container, e.g., a beach cooler, of the type having a pull handle and a pair of retractable wheels the improvement includes a pair of struts (one on either container side) and a pair of strut-positioned wheel assemblies, each mounted for pivoting movement. The U-shaped handle is linearly extensible and retractable and has two arms, each of which includes a cam-like surface. Each such surface bears against a strut for pivoting the wheels between extended and retracted positions, respectively, when the handle is extended or retracted.

U.S. Pat. No. 5,249,438

Inventor: Michael A. Rhaney et al.

Issued: Oct. 5, 1993

A mobile cooler including a compartment having pivotable wheels and a handle assembly for pulling the cooler. A pair of wheel assemblies individually pivot within recesses in the cooler from a raised to a lowered position. In the lowered position the cooler can be transported over smooth or uneven terrain. The handle telescopes partly into the compartment, and partly folds down by a pair of hinges to fit within recesses in the compartment lid. The handle length can be adjusted to suit the user.

U.S. Pat. No. 5,269,157

Inventor: Michael Ciminelli et al.

Issued: Dec. 14, 1993

An insulated beach box in which ice, beverages and various other food products may be placed with the ice maintaining the beverages and food products at a cold and fresh condition even though the beach box is placed on the beach where it may be relatively hot. The beach box includes structural features and attachments which enables the box to be effectively used as a beach chair having a seat back pivotally connected thereto which forms a pull handle when oriented generally in perpendicular relation to the top of the box which forms a seat. The box includes wheels and a rounded corner surface generally in alignment with the seat back which enables the device to be easily pulled over a hard surface by using the wheels and over sand by using the curved corner and adjacent surfaces of the box to facilitate the beach box being pulled to a desired site. The seat back includes pockets for storage of various items and is pivotally supported from the box to enable the seat back to be pivoted forwardly to a generally horizontal position to enable the beach box to be carried by the use of end handles or stored. The seat back also provides an effective support for an optional umbrella which can be detachable clamped thereto and enables various other items that may be carried to or from the beach to be supported by placing them against the upper surface of the seat and the front surface of the seat back with such items being strapped in position if desired.

U.S. Pat. No. 5,373,708

Inventor: Joseph C. Dumoulin, Jr.

Issued: Dec. 20, 1994

A cooler container having a rectangular configuration, each lower corner of the container having a recess. Also provided is a lid with a hinge. A latch is secured to the lid and side wall opposite from the hinge. A plurality of wheels are, each supported within a recess of the container, each wheel having a rod each with an upper end and an associated shaft for pivotally securing the rod to the container, the lower end of each rod being provided with an axle supporting a wheel and an axially reciprocable pin secured to the rod at an intermediate location, the rod being adapted to pivot to an elevated orientation wherein the rod and wheel are totally located within the recess and a lower orientation wherein the rod extends generally vertically with the wheel at a location beneath the cooler for effecting the rolling movement of the container, the recess being formed with a pair of apertures adapted to receive the reciprocable pin, the reciprocable pin being positioned in the lower recess to secure the rod and wheel in the operative rolling orientation and with the pin receivable in the lateral off-set recess for securing the pin, rod and wheel in the stored condition, the reciprocable pin being spring urged into contact with one of the recesses.

U.S. Pat. No. 6,042,122

Inventor: Charles F. Mohr

Issued: Mar. 28, 2000

A convertible sled arrangement 10 for transporting a cooler 100 to and from a beach wherein the arrangement includes a framework unit 11 dimensioned to receive and support a cooler 100 relative to a pair of runner members 30 operatively associated with the framework unit 11; wherein, each of the runner members 30 is provided with a roller assembly 40 that is adapted to be extended and retracted relative to the runner members 30 to provide either a rolling or a sliding transport of the cooler 100 over different terrain.

While these portable coolers may be suitable for the purposes for which they were designed, they would not be as suitable for the purposes of the present invention, as hereinafter described.

SUMMARY OF THE PRESENT INVENTION

The present invention discloses an insulated cooler having ski runners and wheels in combination for mobility for attachment to the underside of the cooler body. The cooler also has an interior partition to form a thermos container portion and an ice cooler portion. A removable thermos with cap and pump spout are disclosed which pump spout extends through a recess in one sidewall of the cooler body. Molded compartments are located on the underside of the cooler lid for storage of various items. Cargo netting is attached to the side of the cooler with snap ring ports which also can hold various items. The underside of the cooler contains recessed wheel wells for receiving the wheels which are attached with retaining pins into mounting holes on the underside of the cooler body. Also disclosed is a umbrella retainer bracket for holding an umbrella shaft using a retaining knob in such a way that the point of the umbrella can be inserted into the sand or ground so as to hold the present invention in a stable position.

A primary object of the present invention is to provide a portable cooler with wheels and ski runner members for transporting cooler and cargo over various types of terrain.

An additional object of the present invention is to provide a portable cooler with detachable cargo pockets, a palm tree umbrella and an umbrella retaining means.

A further object of the present invention is to provide a portable cooler having a interior partitioned into a food storage compartment and a thermos compartment and further having a removable thermos that is retained therein with said thermos having a pump spout that extends through a recess in the cooler sidewall to an exterior portion of said cooler for the dispensing of liquid contained therein.

A yet further object of the present invention is to provide a portable cooler having molded compartments located in the underside of the cooler lid for the storage of eating utensils and condiments.

Another object of the present invention is to provide a portable cooler with detachable cargo pockets for the storage of other accessory items.

Another object of the present invention is to provide a portable cooler that is economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

With regard to reference numerals used, the following numbering is used throughout the drawings.

10 present invention
12 user
14 sand
16 ski runner
18 handle
20 cargo net
22 towels
24 plates
26 cups
28 umbrella
30 shaft of umbrella
32 retaining bracket for umbrella
34 wheels
36 pump spout
38 hinge
40 retainer knob
42 lid of cooler
44 thermos
46 thermos compartment
48 utensil compartment
50 utensils
52 condiment compartment
54 condiment cargo net
56 food storage area
58 partition
60 thermos compartment
62 cap
64 pump spout line
66 recess
68 snap ring ports
70 recess
72 retainer pins
74 palm tree awning
76 point of umbrella
78 latch
80 handle extended
82 cover latch
84 mounting holes

DESCRIPTION OF THE PREFERRED EMBODIMENT(S)

In order that the invention may be more fully understood, it will now be described, by way of example, with reference to the accompanying drawings in which FIGS. 1 through 8 illustrate the present invention being a compartmented mobile cooler.

Figure 1:
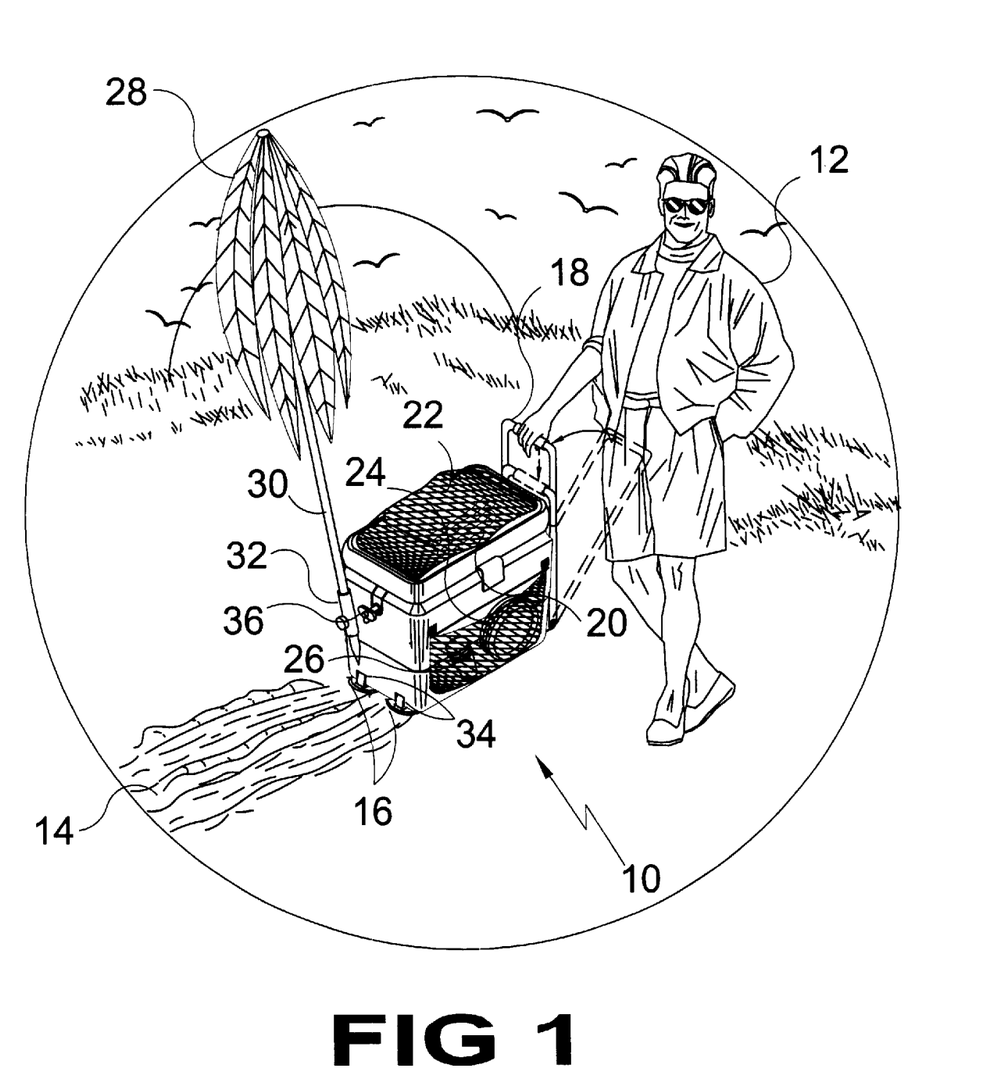
FIG. 1 is a perspective view of the present invention in use showing a user having pulled the cooler device through the sand on the ski runner members attached to the underside of the cooler and retracting the pivoting handle into its stowed position adjacent the cooler body.

Turning to FIG. 1, shown therein is a perspective view of the present invention 10 in use showing a user 12 having pulled the cooler device through the sand 14 on the ski runner or blades 16 members attached to the underside of the cooler 10 and retracting the extendable pivoting handle 18 into its stowed or closed position adjacent the cooler body. Also shown are cargo nets 20 attached to the top and side of the cooler body containing towels 22, plates 24 and cups 26. Also shown is a palm tree type umbrella 28 having an umbrella shaft 30 being held within an umbrella shaft retainer 32 which is attached to one end of the cooler body. Additionally, therein are shown wheels 34 along with the pump spout 36 extending through the wall of the cooler.

Figure 2:
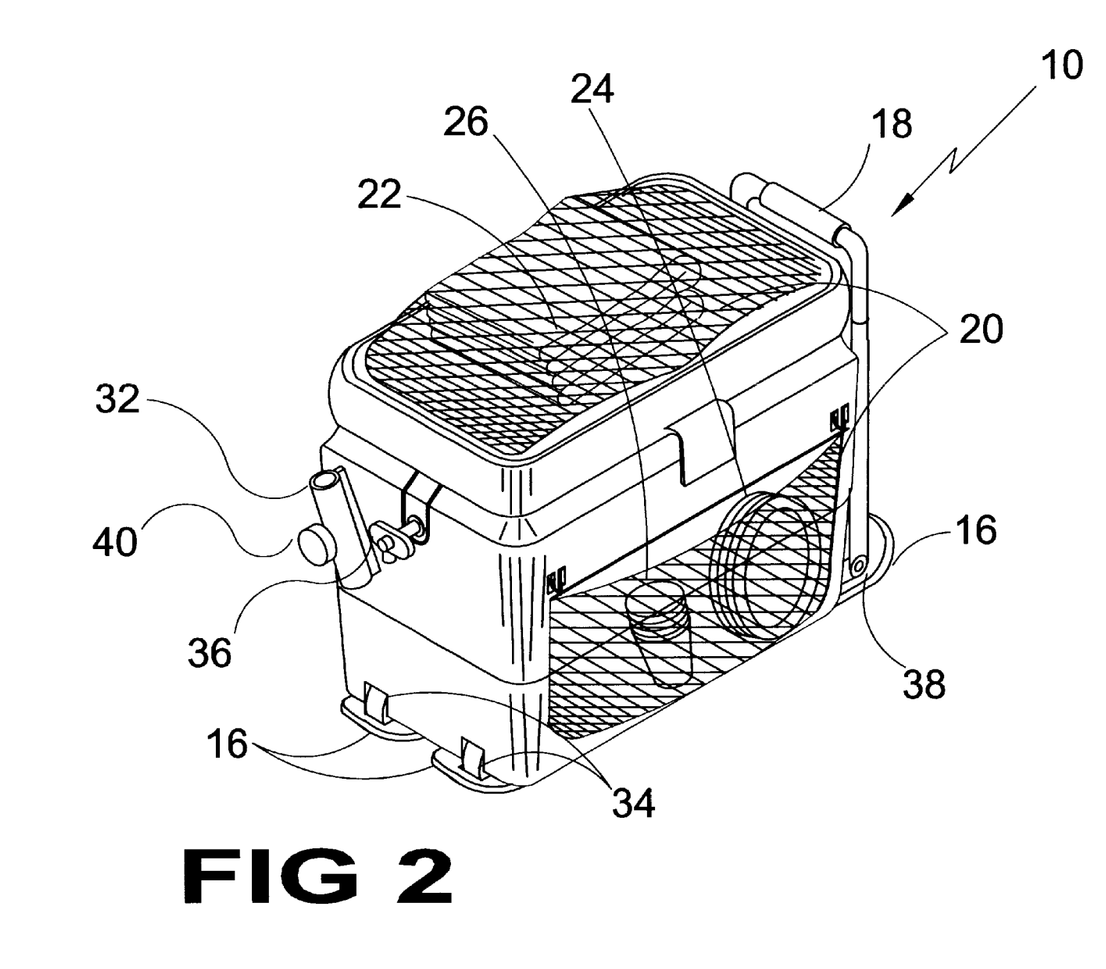
FIG. 2 is a perspective view of present invention.

Turning to FIG. 2, shown therein is a perspective view of present invention. Shown are the ski runner or blades 16 members attached to the underside of the cooler 10 and the extendable pivoting handle 18 retracted into its stowed or closed position adjacent the cooler body. Also shown are cargo nets 20 attached to the top and side of the cooler body containing towels 22, plates 24 and cups 26. Also shown is an umbrella shaft retainer 32 which is attached to one end of the cooler body. Additionally, therein are shown wheels 34 along with the pump spout 36 extending through the wall of the cooler. Also shown is the hinge 38 of handle 18 along with a retainer knob 40 on retaining bracket 32.

Figure 3:
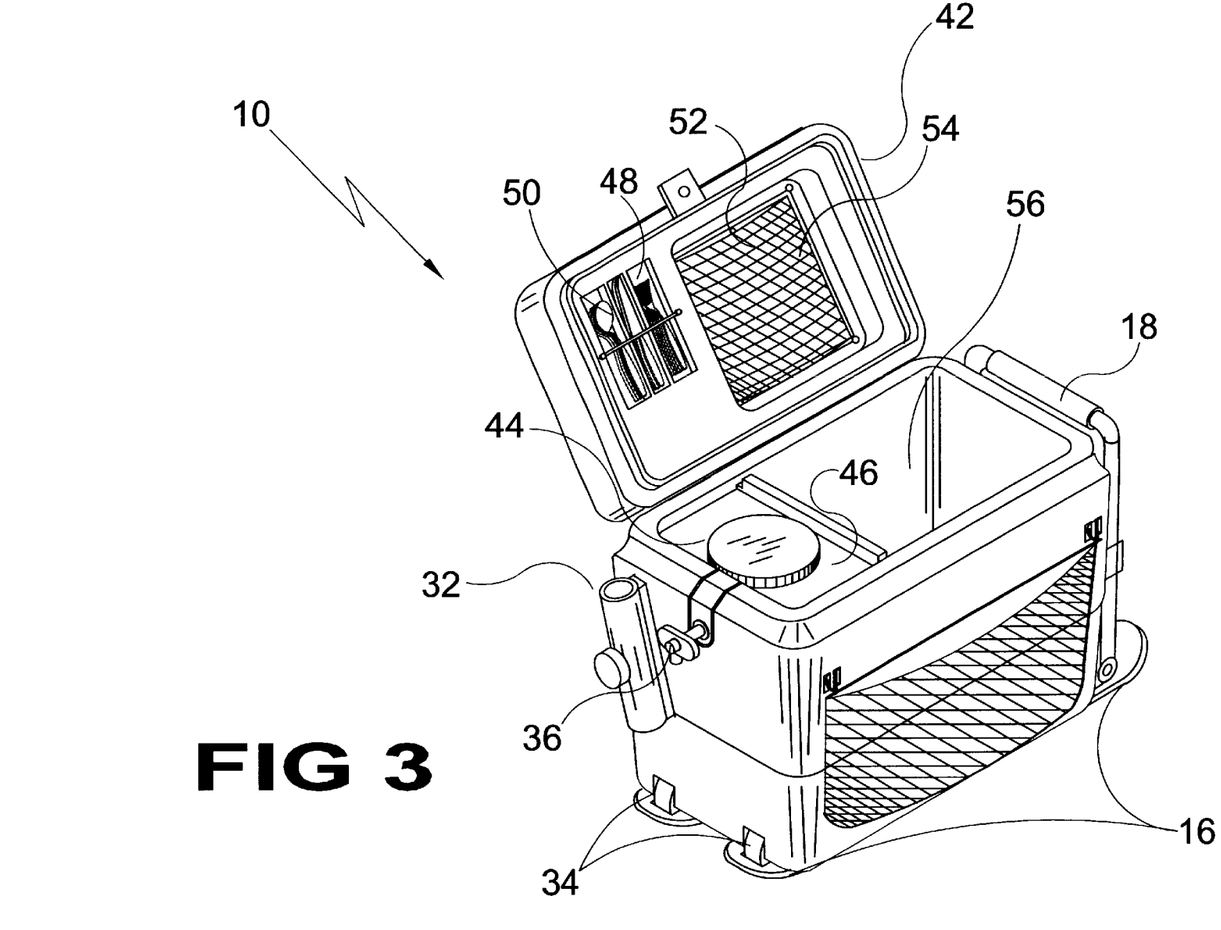
FIG. 3 is a perspective view of the present invention with the cooler lid open to reveal the thermos in the thermos compartment and the molded utensil and condiment compartments.

Turning to FIG. 3, shown therein is a perspective view of the present invention 10 with the cooler lid 42 open to reveal the thermos 44 in the thermos compartment 46 and the molded utensil compartment 48 with utensils 50 and condiment compartments 52 with condiment cargo net 54. Also shown is the food storage area 56 along with other elements previously disclosed.

Figure 4:
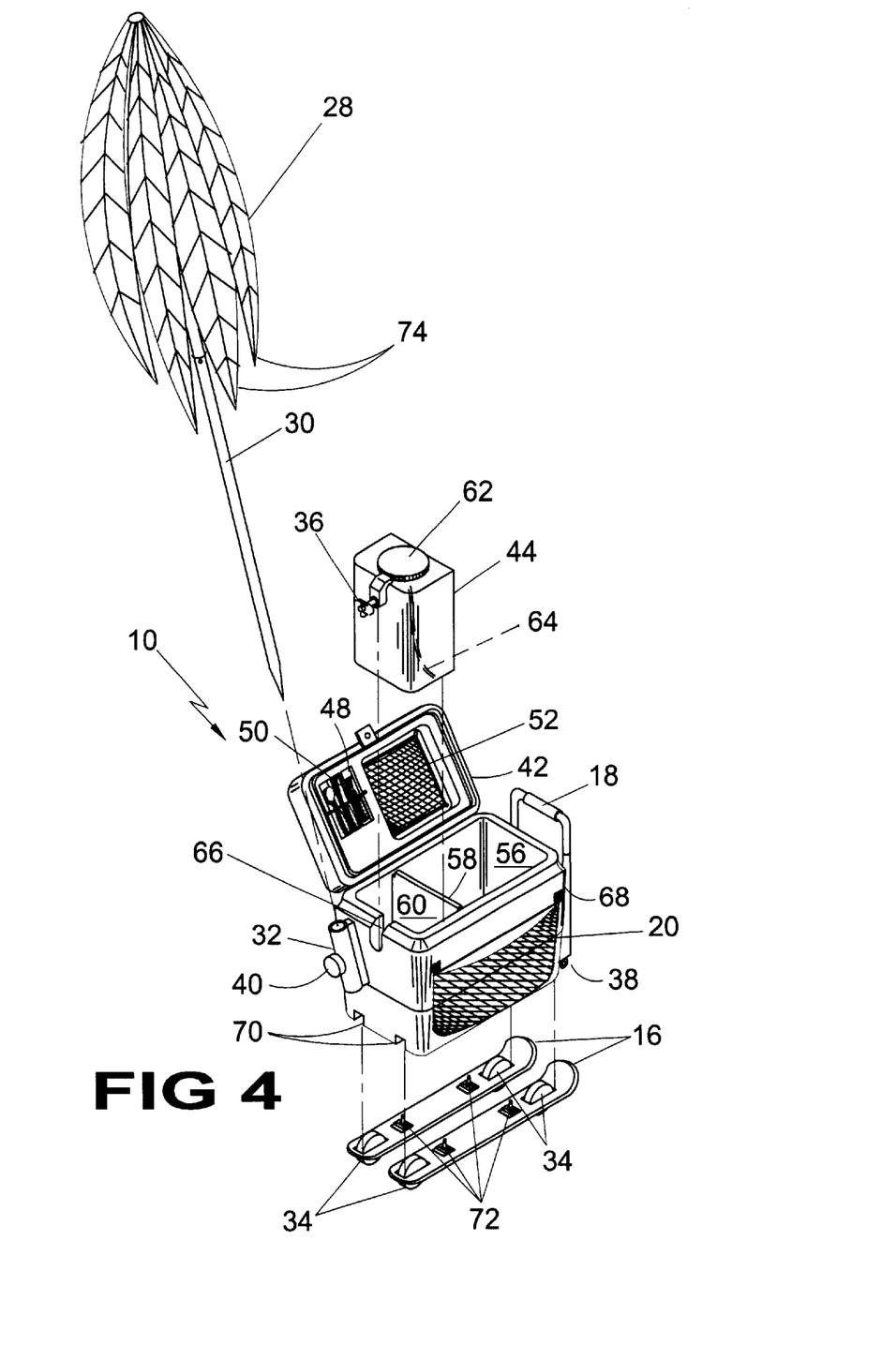
FIG. 4 is an exploded view of the present invention.

Turning to FIG. 4, shown therein is an exploded view of the present invention 10. The present invention 10 includes a cooler container wherein the interior is partitioned at 58 to form a thermos containment portion 60 and an ice cooler portion 56. An independent removable thermos 44 with cap 62 is maintained within the thermos containment portion and has a pump spout 36 with spout line 64 extending through a recess 66 in a cooler container sidewall to an exterior region thereof for dispensing the liquid stored therein. Molded compartments 48, 52 are located on the underside of the cooler lid 42 for the storage of eating utensils 50, condiments and other such sundries. Multiple snap ring ports 68 are connected to the exterior sides of the cooler container and the topside of the cooler lid to provide an attachment means for removable cargo pockets 20 that could hold items such as plates, cups, toys, lotions, towels, blankets, clothes and other such items that the user may desire to transport. The underside of the cooler container has unobtrusive recessed wheels 34 and wheel recesses 70 designed for accepting multiple snap ring or retainer pins 72 attachment means for securing the runner members 16 to the cooler 10. A retractable handle 18 is pivotally hinged at 38 to an inferior portion on a sidewall of the cooler container. The present invention further includes a cylindrical umbrella shaft 30 retainer 32 with a retaining knob 40 to hold an umbrella 28 in a raised position above the ground surface during transport and in place when imbedded in the sand or ground during use. An umbrella 28 with a palm tree type awning 74 could also be included.

Figure 5:
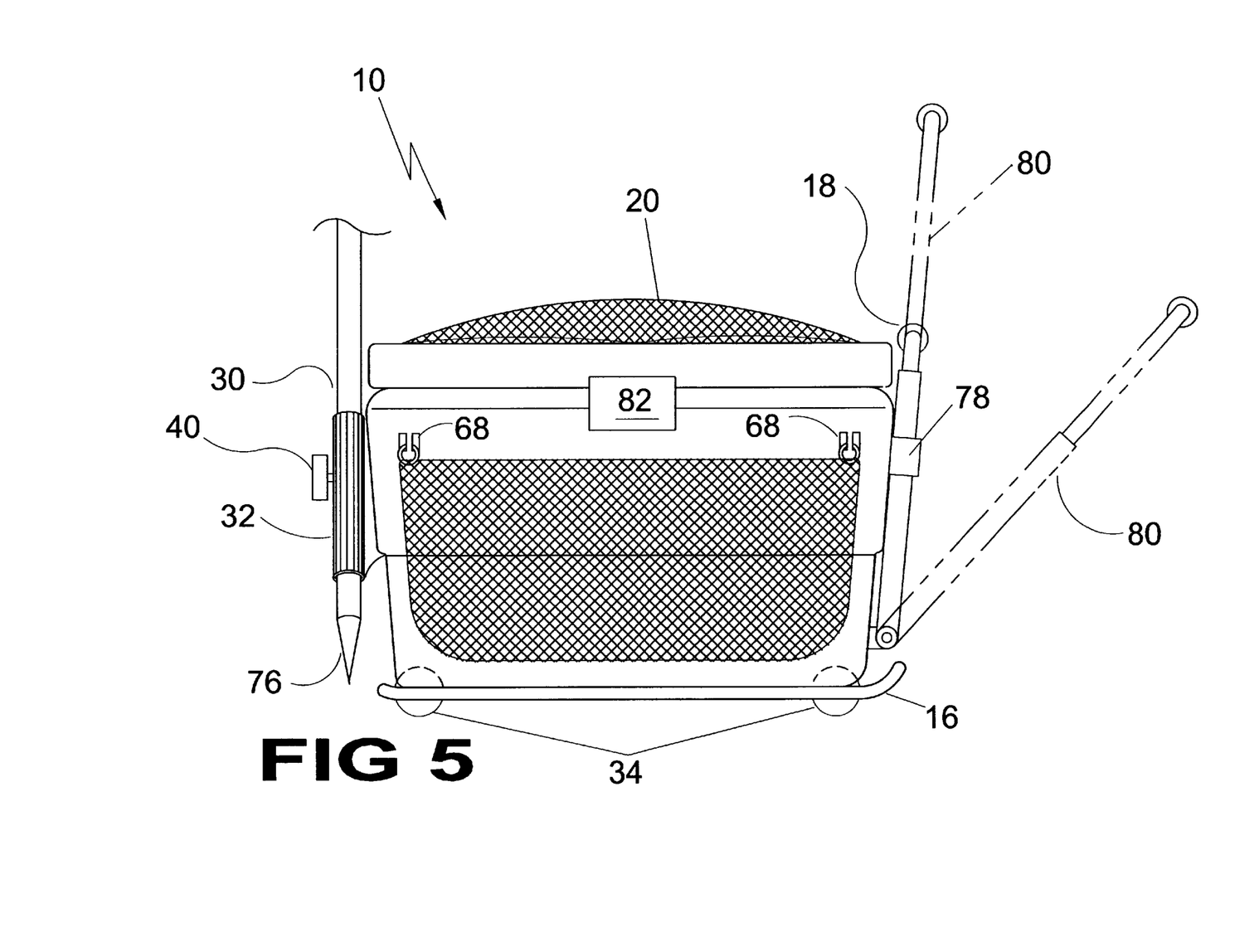
FIG. 5 is a front view of the present invention showing the umbrella shaft secured in the raised traveling position by means of the retaining knob. The maneuverability of the pivoting, telescoping handle is shown in phantom line.

Turning to FIG. 5, shown therein is a front view of the present invention 10 with cover latch 82 showing the umbrella shaft 30 with point 76 secured in the raised traveling position by means of the retaining knob 40. The maneuverability of the pivoting, telescoping handle 18 with handle latch 78 is shown in phantom line extended at 80. Other elements previously disclosed are also shown.

Figure 6:
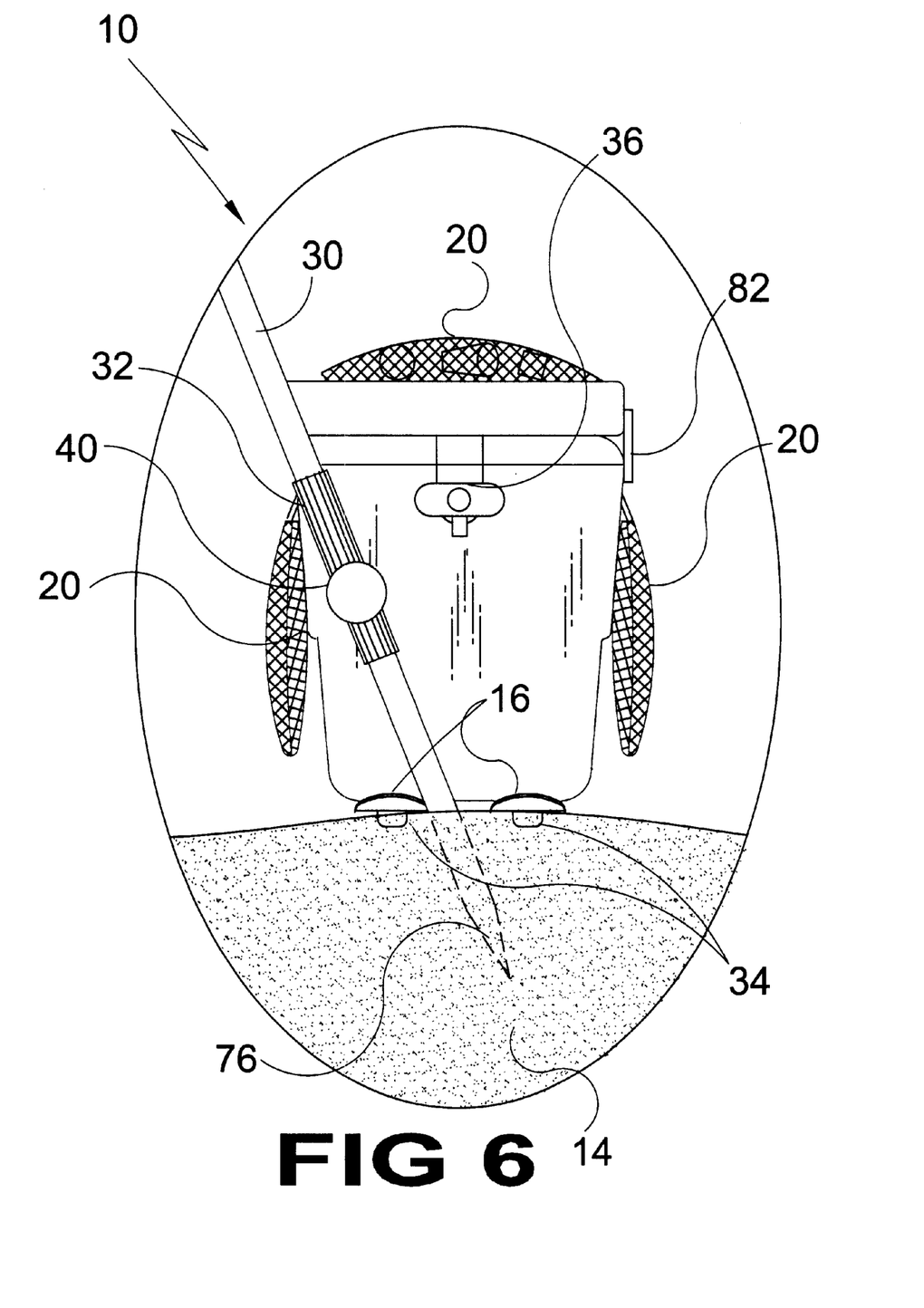
FIG. 6 is a side view of the present invention in use showing the umbrella shaft locked in the umbrella retainer and imbedded in the sand.

Turning to FIG. 6, shown therein is a side view of the present invention 10 in use showing the umbrella shaft 30 locked in the umbrella retainer 32 and imbedded in the sand 14. Other elements previously disclosed are also shown.

Figure 7:
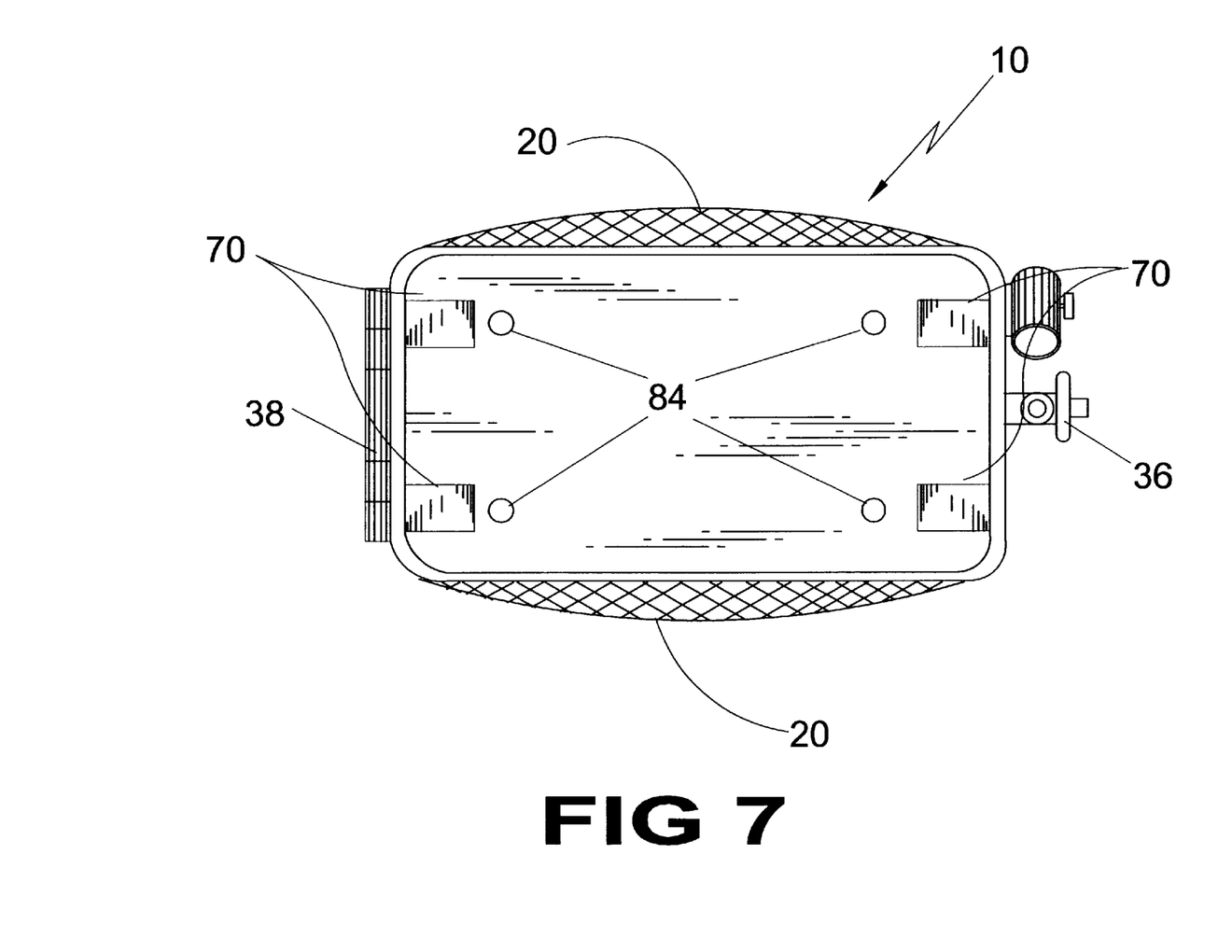
FIG. 7 is a bottom view of the present invention with the runners removed.

Turning to FIG. 7, shown therein is a bottom view of the present invention 10 with the runners removed which exposes the mounting holes 84 in which the retainer pins 72 (not shown, see FIG. 4) are mounted. Other elements previously disclosed are also shown.

Figure 8:
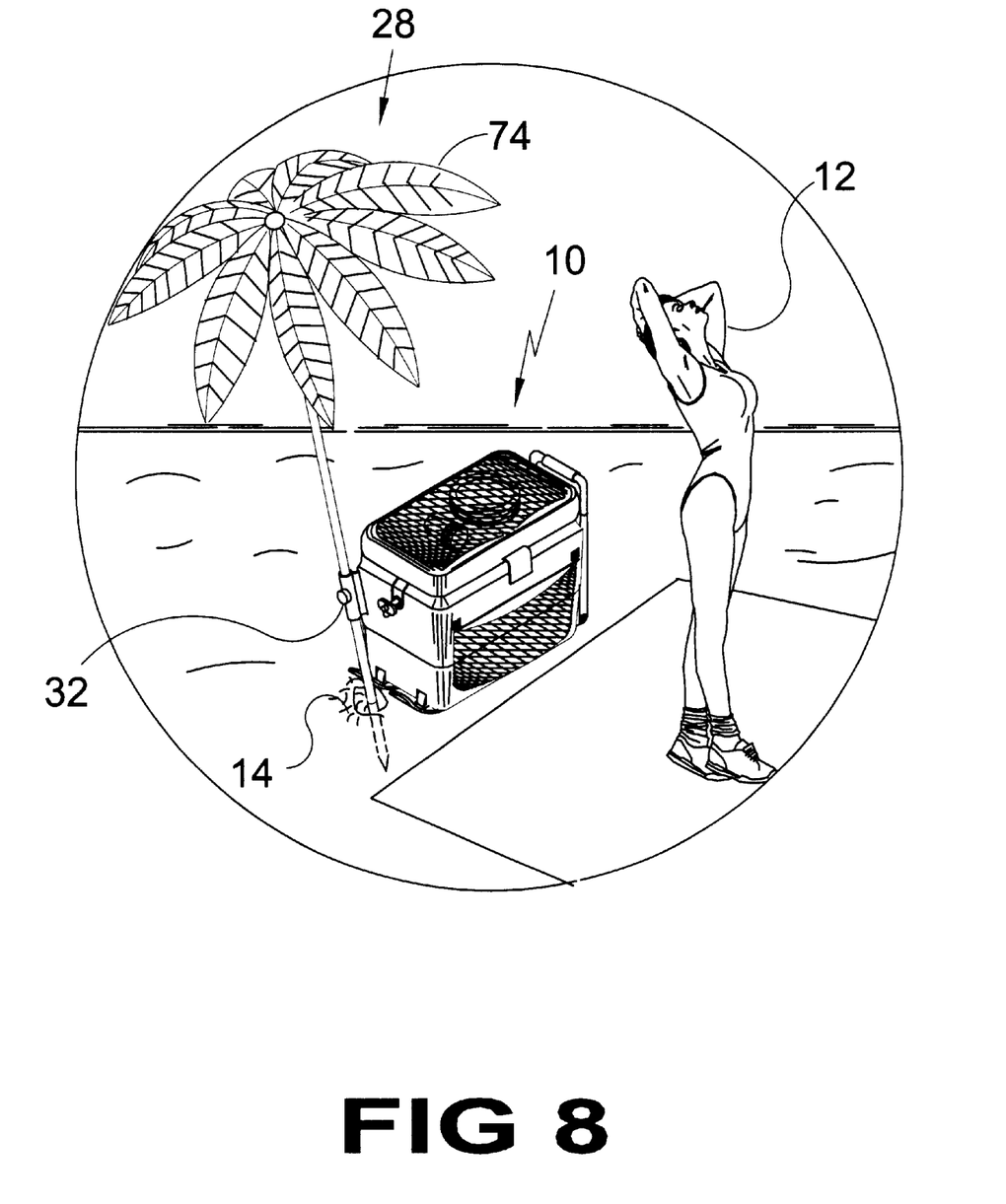
FIG. 8 is a perspective view of the present invention in use showing the palm tree umbrella opened up and locked in the umbrella retainer while imbedded in the sand.

Turning to FIG. 8, shown therein a perspective view of the present invention 10 in use by a user 12 showing the palm tree umbrella 28, 74 opened up and locked in the umbrella retainer 32 while imbedded in the sand 14.

What is claimed to be new and desired to be protected by letters patent is set forth in the appended claims:

We claim:

1. An insulated cooler for holding food items, comprising:
    a) a cooler body, said body being generally rectangular shaped, said cooler body having a top, a bottom, a front, a rear, a first side, a second side, an interior, and an exterior;
    b) means for transporting said cooler body, said means for transporting disposed on said bottom of said cooler body;
    c) a lid disposed on said top of said cooler body, said lid having a latch disposed thereon for connecting to said cooler body;
    d) a partition disposed on said interior of said cooler body, said partition providing a first compartment and a second compartment on said interior;
    e) a means for a retainer disposed on said first side of said cooler body for retaining an umbrella shaft therein;
    f) a handle disposed on said second side of said cooler body;
    g) a plurality of cargo nets disposed on said exterior of said cooler body for holding various items;
    h) said exterior of said cooler body further comprises a plurality of snap ring ports for attachment of said cargo nets thereto;
    i) said cargo nets further comprise a plurality of snap rings for attachment to said snap ring port on said exterior of said cooler body;
    j) at least one recess formed into the interior of said lid of said cooler body, wherein said recess further comprises means for securing items within said recess;
    k) a thermos disposed in said first compartment on said interior of said cooler body; and
    l) said thermos further comprises a bottle, a pump spout, a pump spout line, and a cap disposed thereon.

2. The apparatus of claim 1, wherein said first side of said cooler body has a recess therein, said recess formed on the upper edge of said first side, said pump spout disposed in said recess.

3. The apparatus of claim 1, further comprising an umbrella, said umbrella having a shaft thereon, said shaft having a point thereon.

4. The apparatus of claim 3, wherein said means for a retainer further comprises a cylindrical body having a bore therein, said bore for receiving said shaft of said umbrella.

5. The apparatus of claim 4, further comprising a retainer knob disposed on said cylindrical body, said knob for securing said shaft of said umbrella therein, said shaft being slidably fixed within said cylindrical body.

6. The apparatus of claim 5, wherein said point of said shaft can be inserted into the ground so that said cooler body can be securely positioned.

7. The apparatus of claim 6, wherein said handle has means for adjusting whereby the length of said handle can be varied, said handle being hinged to said second side of said cooler body, further comprising a latch for securing said handle to said second side of said cooler body.

8. The apparatus of claim 7, wherein said means for transporting further comprises at least one ski runner member, said ski runner member having a first wheel and a second wheel thereon, said ski runner member having means for attaching to said bottom of said cooler body, said ski runner member complementarily sized as said cooler body.

9. The apparatus of claim 8, wherein said bottom of said cooler body has multiple recesses therein, said recesses for receiving said wheels of said ski runner member.

10. The apparatus of claim 9, wherein said means for attaching said ski runner member to said cooler body further comprises multiple retainer pins.

11. The apparatus of claim 10, wherein said bottom of said cooler body has multiple mounting holes therein, said mounting holes for receiving said retainer pins for attaching said ski runner members to said cooler body.

* * * * *